United States Patent
Alqurishi et al.

(10) Patent No.: US 12,431,139 B1
(45) Date of Patent: Sep. 30, 2025

(54) SYSTEM AND METHOD FOR ENHANCED CUSTOMER SERVICE THROUGH AUTOMATED REAL-TIME FAQ GENERATION FROM CALL CENTER INTERACTIONS

(71) Applicant: ELM, Riyadh (SA)

(72) Inventors: Muhammad Saleh Saeed Alqurishi, Riyadh (SA); Anas Alhmoud, Riyadh (SA); Yasser Alomar, Riyadh (SA); Riad Souissi, Riyadh (SA)

(73) Assignee: ELM, Riyadh (SA)

( * ) Notice: Subject to any disclaimer, the term of this patent is extended or adjusted under 35 U.S.C. 154(b) by 0 days.

(21) Appl. No.: 18/882,696

(22) Filed: Sep. 11, 2024

Related U.S. Application Data

(60) Provisional application No. 63/572,624, filed on Apr. 1, 2024.

(51) Int. Cl.
| | |
|---|---|
| *G10L 21/00* | (2013.01) |
| *G06F 16/2457* | (2019.01) |
| *G10L 15/26* | (2006.01) |
| *H04M 3/42* | (2006.01) |

(52) U.S. Cl.
CPC ........ *G10L 15/26* (2013.01); *G06F 16/24578* (2019.01); *H04M 3/42221* (2013.01)

(58) Field of Classification Search
CPC ... G10L 15/26; G10L 15/22; G06F 16/24578; G06F 40/40; H04M 3/42221; H04L 51/02; G06Q 30/0201
USPC ....................................................... 704/270
See application file for complete search history.

(56) References Cited

U.S. PATENT DOCUMENTS

| | | | |
|---|---|---|---|
| 2020/0110732 A1 | 4/2020 | Beaver | |
| 2024/0078391 A1* | 3/2024 | Kim | ........................ G06F 40/40 |
| 2024/0119938 A1 | 4/2024 | Laird et al. | |
| 2024/0346255 A1* | 10/2024 | Blohm | .................... G06F 40/40 |
| 2024/0386886 A1* | 11/2024 | Sharifi | .................... G10L 15/22 |

(Continued)

FOREIGN PATENT DOCUMENTS

| | | | | |
|---|---|---|---|---|
| CN | 117370519 A | | 1/2024 | |
| CN | 118114653 A | * | 5/2024 | |
| EP | 3905149 A1 | * | 11/2021 | ............. G06Q 10/00 |

*Primary Examiner* — Md S Elahee
(74) *Attorney, Agent, or Firm* — Oblon, McClelland, Maier & Neustadt, L.L.P.

(57) ABSTRACT

An automated system for generating Frequently Asked Questions (FAQs) from call center interactions includes a call center device for recording audio conversations between agents and customers, and a backend system. The backend system segments the conversation between agent and customer speech, converts the segmented speech into text using an Automatic Speech Recognition engine, and generates FAQs using a Large Language Model. Each FAQ includes a query statement corresponding to the customer's speech and at least one answer statement corresponding to the agent's speech. The system also includes mechanisms for selecting relevant, non-duplicate FAQs, determining the importance of each FAQ based on frequency, sentiment, and coherence scores, and dynamically updating the FAQ database in real-time. A user interface displays the generated FAQs with dropdown arrows to view the answers, enhancing customer service efficiency and accuracy by providing immediate, relevant responses to common inquiries.

20 Claims, 11 Drawing Sheets

(56) References Cited

U.S. PATENT DOCUMENTS

2025/0117814 A1\* 4/2025 Bennett .............. G06Q 30/0201
2025/0119396 A1\* 4/2025 Taheri ..................... H04L 51/02

\* cited by examiner

400

| File | Recording |
|---|---|

[Upload file (.wav, .mp3)]  [Process audio]

Agent:
Peace be upon you. Hajj and Umrah Information Center with Khadija. How can I help you?

Customer:
Peace be upon you and God's mercy. I have a question.

Agent:
Go ahead.

Customer:
I have an absconded Mu'tamir. What should I do? What are the procedures in this case?

Agent:
It seems that the system is available now, correct?

Customer:
Yes, I have already started using the system.

Agent:
Great. In the menu, you will find the option "Mu'tamir Movements." Click on it and select "Movement Type" from the side menu.

Customer:
Okay.

Agent:
After that, you will add the escape report.

[Generate FAQ]

| File | Recording |
|---|---|
| Upload file (.wav, .mp3) | Process audio |

| How can I know the status of the Mu'tamir if they are still in Saudi Arabia or have left it? | ⌄ |
|---|---|
| How can I search for a specific Mu'tamir in the system? | ⌄ |
| What is the procedure in case a Mu'tamir escapes? | ⌄ |
| What documents are required when filing an escape report? | ⌄ |
| What happens if I am not prepared with the required documents beforehand? | ⌄ |

FIG. 5

SYSTEM AND METHOD FOR ENHANCED CUSTOMER SERVICE THROUGH AUTOMATED REAL-TIME FAQ GENERATION FROM CALL CENTER INTERACTIONS

CROSS-REFERENCE TO RELATED APPLICATIONS

This application claims the benefit of priority to U.S. provisional application No. 63/572,624 filed Apr. 1, 2024, the entire contents of which are incorporated herein by reference.

BACKGROUND

Technical Field

The present disclosure is directed to the field of customer service systems and, more specifically, to systems and methods for enhancing customer service through the automated generation of frequently asked questions (FAQs) in real-time from call center interactions.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The landscape of customer service is undergoing significant transformation, driven by technological advancements and evolving consumer expectations. Among the transformations, customer service is moving towards an automated interaction prior to speaking with a live person. The shift towards digital-first customer interactions has been accelerated by the COVID-19 pandemic, compelling companies to adopt new technologies to meet consumer demands for rapid, efficient, and personalized service. The shift has resulted in increased call volumes and the complexity of customer inquiries, thereby straining existing customer service capacities.

Aforementioned challenges are exacerbated by a scarcity of skilled customer care personnel, as organizations face high attrition rates and difficulties in training new employees to proficiency. As customer interactions become more intricate, the role of customer service agents is evolving, necessitating a transition from transactional tasks to more solution-oriented engagements. Rising customer expectations impose a high standard for service quality across all sectors. Consumers, influenced by their positive experiences with leading companies, now expect seamless, intuitive, and personalized service from every interaction. Such trend underscores the imperative for businesses to continuously refine their customer service strategies to remain competitive.

In response to these challenges, companies are increasingly leveraging AI and data analytics. AI-powered customer service solutions have the potential to enhance customer satisfaction through predictive analytics, automated self-service tools, and personalized interactions. This technology-driven approach can streamline operations, reduce the workload on human agents by automating routine tasks, and enable more meaningful customer engagements. The adoption of AI in customer service is reflected in the evolving maturity levels of AI-driven customer engagement, with leading institutions implementing proactive and efficient engagement strategies.

However, the adoption of generative AI and other advanced technologies presents certain challenges. Issues such as inaccuracy, cybersecurity, and regulatory compliance pose potential risks. Despite the concerns, organizations can effectively harness AI technologies to create new business opportunities, improve service delivery, and enhance customer engagement. High-performing companies, in particular, demonstrate a greater propensity to leverage AI for product and service development, showcasing the strategic value of AI beyond mere cost reduction. The ongoing shift towards AI-enabled customer service ecosystems represents a step forward towards meeting modern consumer expectations and addressing the operational challenges faced by businesses. As the technology landscape continues to evolve, companies must navigate these changes judiciously, balancing the benefits of automation and AI with the indispensable value of human interaction in customer service.

Existing customer service technologies primarily include Interactive Voice Response (IVR) systems, Customer Relationship Management (CRM) software, digital communication tools, such as email and live chat, and AI-driven chatbots and virtual assistants. IVR systems are configured to manage call volumes by directing customers to appropriate service channels, but they often fail to handle complex inquiries effectively, leading to customer frustration. CRM software provides a comprehensive view of customer interactions and aids in managing follow-ups, yet it lacks real-time processing capabilities to generate immediate insights or solutions. Digital communication tools facilitate instant interaction but require significant human labor to manage, especially during peak times, and do not offer automated, data-driven responses.

AI-driven chatbots and virtual assistants have progressed the field by providing instant responses and round-the-clock availability. However, the effectiveness of the conventional technologies is often limited by the scope of their programming and their ability to understand and process complex or nuanced customer requests. These conventional technologies face significant challenges in delivering seamless, intuitive, and personalized customer service experiences, and lack the capability to integrate deep learning for continuous improvement and real-time adaptation to changing and complex customer requests.

Each of the conventional technologies, thus, presents limitations in their scope and capability, failing to address specific elements critical to the optimal design and management of AI-enabled customer service ecosystems. The conventional technologies lack aspects of combining AI-powered customer service solutions, predictive analytics, automated self-service tools, and personalized interactions to effectively manage customer interactions and meet rising consumer expectations.

Thus, there exists a need for an integrated system to keep AI-enabled customer service ecosystems up to date with respect to changing and more complex customer requests. There is also a need for a method for optimal deployment and operation of AI technologies within customer service environments, ensuring cost-effective, reliable, and personalized service for customers. Accordingly, it is one object to provide a system and method for the integration of AI-powered solutions and data analytics for real time adaptation of customer service operations to changing and more complex customer requests, ensuring enhanced customer satisfaction and efficient service delivery.

SUMMARY

In an exemplary embodiment, a computer-implemented method for the automated generation of Frequently Asked Questions (FAQs) from call center interactions is described. The method includes inputting a call center audio conversation between an agent and a customer, segmenting the conversation between speech by the agent and speech by the customer, and converting the segmented speech into text using an Automatic Speech Recognition (ASR) engine. FAQs are then generated from the text by a large language model (LLM), wherein each FAQ includes a query statement corresponding to the customer's speech and at least one answer statement corresponding to the agent's speech. The LLM outputs a plurality of factors associated with each generated FAQ. The method further includes ranking the generated FAQs based on the plurality of factors, and displaying the generated FAQs in ranked order.

In another exemplary embodiment, a call center system is described. The system includes a call center device for conducting an incoming audio call, providing answers, and recording the audio call as a conversation between a call center agent and a customer. A backend system is configured to segment the conversation between speech by the agent and speech by the customer, convert the segmented speech into text using an ASR engine, and generate FAQs from the text using a LLM. Each FAQ includes a query statement corresponding to the customer's speech and at least one answer statement corresponding to the agent's speech. The system further includes a call center interface for displaying the conversation and an icon and associated function to generate a FAQ. The LLM is configured to output a plurality of factors associated with each generated FAQ. The backend system is further configured to rank the generated FAQs based on the plurality of factors, and display the generated FAQs in ranked order.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4 is a visual representation of an exemplary call transcription corresponding to a call between an agent and a customer, according to certain embodiments.

FIG. 5 is a visual representation of exemplary generated FAQs derived from one or more customer service calls addressing a same issue, according to certain embodiments.

DETAILED DESCRIPTION

Figure 1A:
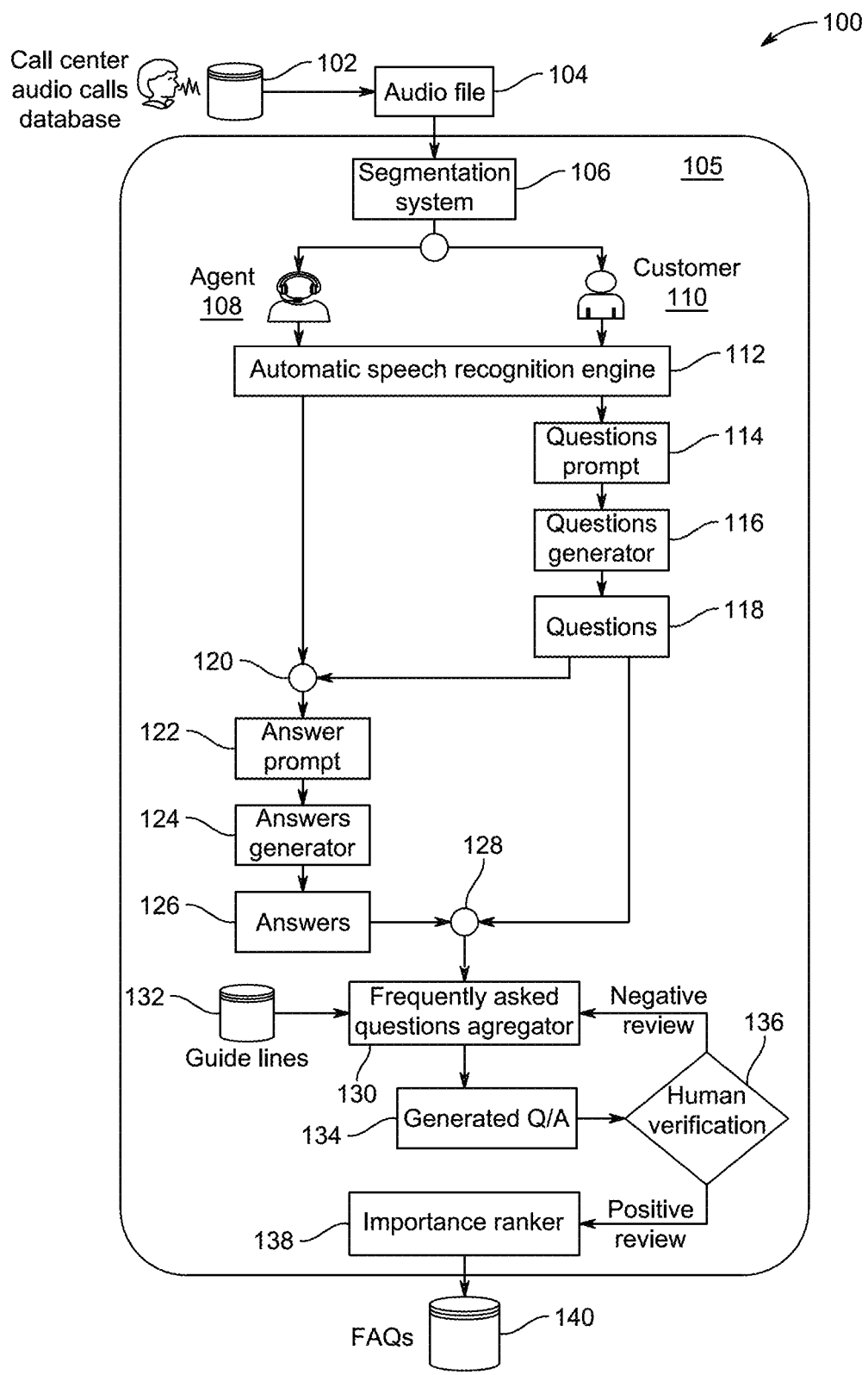
FIG. 1A illustrates an architecture of a call center system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to enhancing customer service through the automated generation of Frequently Asked Questions (FAQs) from call center interactions, enhancing customer support automation. The system integrates conversation segmentation algorithms, an Automatic Speech Recognition (ASR) engine, and advanced Large Language Models (LLMs) to automate the process of generating accurate and contextually relevant FAQs directly from the nuanced dialogues occurring in real-time customer-agent interactions.

Additionally, the system includes a human verification process to ensure the highest standards of accuracy and relevance in the generated content. The system also includes a dynamic, real-time update mechanism to keep the FAQ content current with emerging customer inquiries. The system, thus, significantly streamlines the creation and maintenance of a knowledge base for customer support. By providing immediate and accurate updated responses to customer queries, the system enhances the efficiency of customer service operations, improves overall customer satisfaction, and reduces the workload on service representatives.

The system offers a scalable and efficient means for transforming call center audio recordings into a structured and informative FAQ resource. The system is based on the speech recognition and natural language processing technologies to deliver an automated, reliable, and continuously generated updated FAQs.

FIG. 1A illustrates an architecture of a call center system 100 configured for automated FAQ generation from call center interactions. The call center system 100, alternatively referred to as a system 100, includes a plurality of components that work in conjunction to process call center audio files, transcribe them, generate relevant FAQs, and verify the content.

The system 100 includes a call center audio calls database 102. The call center audio calls database 102 is a repository where audio files 104 containing dialogues between customers 110 and service agents 108 are stored. The call center audio calls database 102 stores large volumes of audio data and supports various file formats, such as WAV, MP3, and FLAC. These audio files capture the entirety of conversations, including background noise, overlapping speech, and varying audio qualities, posing significant challenges for subsequent processing. The call center audio calls database 102 is equipped with indexing and search capabilities to quickly retrieve specific audio recordings based on metadata, such as date, time, agent, and customer identifiers.

The audio files 104 are then processed by a backend system 105. The backend system 105 implements various components for generating final FAQs. In one aspect, the backend system 105 includes a segmentation system 106. The segmentation system 106 is configured to process the audio files 104 to distinguish between the voices of the agent 108 and the customer 110. The segmentation system 106 implements methods, such as speaker diarization techniques and voice activity detection, to accurately separate and label the audio streams. For example, the segmentation system 106 can identify when an agent 108 is speaking versus when a customer 110 is speaking, even in the presence of background noise or overlapping dialogue. Segmentation is performed for correctly attributing each part of the to the respective speaker, which is essential for generating accurate transcriptions and subsequent FAQ content.

The agent 108 refers to a customer service representative who interacts with the customer 110. Agents 108 are responsible for addressing customer inquiries, providing solutions, and offering support. In the context of the system 100, spoken words of the agent are transcribed and analyzed to generate accurate and relevant FAQs. The system can handle multiple agents, each identified by unique metadata, ensuring that their contributions to the conversation are correctly attributed. For example, if the agent 108 provides troubleshooting steps for a technical issue, the segmentation system 106 will capture and transcribe these instructions accurately, making them available for future reference in the FAQ database.

The customer 110 is the end-user or client who interacts with the call center. Customers 110 seek assistance for various issues, ranging from technical support to billing inquiries. The system 100 captures and processes spoken words of the customer to generate questions and answers that can be used to build the FAQ database. The customer 110 can access the FAQs to find answers to customer queries without engaging with the agent 108, reducing the workload on customer service representatives and improving customer satisfaction. For instance, if the customer 110 asks about the process for returning a product, the system 100 will generate a question and answer pair that details the return procedure, making this information readily available to other customers with similar inquiries.

The segmented audio files collected from the agent 108 and the customer 110 are then input into the ASR engine 112, which converts the audio into written text. The ASR engine 112 includes machine learning models trained on large datasets to achieve high accuracy in transcription. The ASR engine 112 is configured to analyse various accents, dialects, and speech patterns, and is capable of understanding industry-specific terminology. As would be understood, a dialect is a form of the language that is spoken by a particular group of people. Examples of ASR engines include Google Cloud Speech-to-Text®, IBM Watson Speech to Text®, and Amazon Transcribe®.

In one aspect of the present disclosure, the dataset is composed for training the machine learning models of the ASR engine 112. The dataset is an extensive aggregation of transcribed interactions collected from call centers. These interactions relate to conversations between customers 110 and the agents 108, addressing a wide range of customer care issues, such as technical support, billing inquiries, product feedback, and service requests. The richness and diversity of the dataset are important, as they expose the Large Language Model (LLM) to a broad spectrum of language usage, question types, and problem-solving approaches. For instance, the dataset includes subject areas like technology troubleshooting, account management, product returns, billing questions, and service feedback. Each transcript is accompanied by metadata annotations that categorize the nature of the inquiry (e.g., billing, technical support) and the outcome of the call (resolved, escalated, referred to another department). This metadata is utilized for training the LLM to recognize and classify different types of interactions effectively.

Composition of dataset faces challenges related to speech recognition, particularly when utilizing a dataset that encompasses a broad spectrum of Arabic dialects. In one implementation, a composite loss function is determined to address the challenges. The composite loss function integrates categorical cross-entropy with dialectal and temporal discrepancy considerations, thereby enhancing the model performance across diverse dialectical variations.

The proposed loss function is formulated as follows:

$$\mathcal{L} = \lambda_1 \mathcal{L}_{CCE} + \lambda_2 \mathcal{L}_{DTDL};$$

where $\mathcal{L}_{CCE}$ is the Categorical Cross-Entropy Loss, $\mathcal{L}_{DTDL}$ is the Dialectal Temporal Discrepancy Loss, and $\lambda_1$ and $\lambda_2$ are the weighting coefficients that balance the contributions of each component.

The Categorical Cross-Entropy Loss is determined by:

$$\mathcal{L}_{CCE} = -\sum_{i=1}^{N} \sum_{j=1}^{M} y_{ij} \log(\hat{y}_{ij});$$

where N is the number of samples, M is the number of classes, $y_{ij}$ is the true label for sample i for class j, and $\hat{y}_{ij}$ is the predicted probability of sample i for class j.

The DTDL component is presented as:

$$\mathcal{L}_{DTDL} = \alpha \mathcal{L}_{Dialect} + \beta \mathcal{L}_{Temporal}$$

Dialect Classification Loss, $\mathcal{L}_{Dialect}$, is determined by:

$$\mathcal{L}_{dialect} = -\sum_{k=1}^{K} y_k \log(\hat{y}_k)$$

where K represents the number of dialects, $y_k$ is the true label for the dialect, and $\hat{y}_k$ is the predicted probability for the dialect.

Temporal Alignment Loss, $\mathcal{L}_{Temporal}$, is represented by:

$$\mathcal{L}_{Temporal} = DTW(P,Q)$$

where P and Q are the sequences of predicted and true feature vectors, respectively, and DTW denotes the dynamic time warping algorithm, which calculates the optimal alignment between these sequences.

The comprehensive loss function is determined to optimize both the transcription accuracy and the adaptability of the speech recognition model to the rich variety of Arabic dialects and speech tempos.

The composed dataset is preprocessed before implementing the datasets for training. Preprocessing includes various techniques, applied as separately or in combination with each other, including normalization, anonymization, and segmentation.

Normalization is the process of converting the text in the dataset to a standard format. Normalization includes correcting spelling errors, standardizing colloquial expressions to their formal equivalents, and unifying the use of language to reduce variability in how similar concepts are expressed. Normalization is performed for ensuring that the machine learning model does not get confused by linguistic variations that essentially convey the same meaning. For example, a colloquial statement like "Umm, my internet's been super slow for like a week now, what's up with that?" is normalized to "My internet connection has been very slow for the past week. What is the cause of this issue?" This transformation reduces the complexity of language that the LLM must interpret, enabling more accurate processing and understanding.

Given the personal nature of many customer service calls, transcripts often contain sensitive information that must be protected. Anonymization includes removing or obscuring any personally identifiable information (PII), such as names, addresses, phone numbers, and account details to ensure privacy and compliance with data protection standards. For instance, a statement like "My name is John, and my account number is 123456" is anonymized to "My name is [Name], and my account number is [Account Number]." Anonymization is performed for maintaining customer confidentiality and complying with privacy regulations, ensuring that the dataset can be used for model training without compromising personal information.

Segmentation includes breaking down the continuous flow of conversation into discrete question-answer pairs. Segmentation is performed for structuring the data in a manner that aligns with the objective of training the LLM to generate FAQs. Each segment is tagged with relevant metadata to facilitate targeted training, allowing the model to learn the context and content of interactions more effectively. For example, a conversation segment where a customer says, "I've noticed unauthorized transactions on my account. Can you help?" and the representative responds, "Certainly, I can help you with that. Let's start by securing your account," is segmented and tagged as follows:

Question: "What should I do if I notice unauthorized transactions on my account?"
Answer: "If you notice unauthorized transactions, the first step is to secure your account."
Metadata Tags: [Billing and Account Management, Security]

Thereby, the preprocessing steps transform raw call center transcripts into a structured and sanitized dataset, optimizing it for the training of the LLMs. By standardizing the language, protecting user privacy, and segmenting the data into a format conducive to learning, the dataset becomes a robust foundation for developing advanced models capable of generating accurate and relevant FAQs. The structured dataset ensures that the LLM is exposed to a wide range of scenarios and solutions, enhancing its ability to provide precise and helpful answers in real-world applications.

Normalization, anonymization, and segmentation collectively improve the quality and usability of the dataset. Normalization ensures consistency in language use, reducing the cognitive load on the model. Anonymization maintains the confidentiality of personal information, allowing the dataset to be used without ethical or legal concerns. Segmentation breaks down complex conversations into manageable parts, making it easier for the LLM to learn and generate accurate FAQs. These pre-processing steps are performed for creating a high-quality dataset that supports effective model training and accurate FAQ generation.

The text generated by the ASR engine 112 is subsequently utilized to initiate the generation of questions through a questions prompt 114 and a questions generator 116. The questions prompt 114 is a component that identifies segments of the audio file 104 that likely contain customer inquiries. The questions prompt 114 is configured to detect and isolate parts of the conversation where the customer is seeking information or assistance. For example, the prompt might detect phrases like "How do I . . . " or "What should I . . . " as indicative of a customer question.

The questions generator 116, which is a LLM-based component, implements Natural Language Processing (NLP) techniques to formulate pertinent questions based on the segments identified by the questions prompt 114. The questions generator 116 analyzes the context and content of the identified segments to generate questions that accurately reflect the customer's concerns. For example, if a customer asks, "How can I reset my password?" the questions generator 116 will formulate this into a clear and concise question suitable for inclusion in an FAQ.

Simultaneously, an answer prompt 120 activates the answers generator 122 to produce corresponding answers 124 based on transcriptions of the agent. The answer prompt 120 functions similarly to the questions prompt 114 but focuses on identifying segments of the transcription where the agent 108 provides solutions or information. The questions prompt 114 detects agent responses and extracts relevant sections that can be used to generate accurate and helpful answers.

The answers generator 122 utilizes advanced NLP and machine learning techniques to create concise and relevant answers from the identified agent responses. It ensures that the generated answers 124 are directly aligned with the customer's questions, providing clear and precise information. For instance, if the agent explains the steps to reset a password, the answers generator 122 will produce an answer that details these steps in a structured and easy-to-understand format.

The generated answers 126 are then combined with the questions 118 by a combiner 128 to form cohesive Q&A pairs. The questions 118 and answers 126 are aggregated by the frequently asked questions aggregator 130, producing a set of generated Q/As 132. The aggregator 130 organizes and structures the Q&A pairs 134 to ensure that the question 118 and answers 126 are easily searchable and accessible. The aggregator 130 includes categorizing the Q&A pairs based on topics, keywords, and relevance to make it easier for customers to find the information they need.

The guidelines provide a framework for the FAQ content, ensuring it adheres to specified standards. The guidelines includes formatting rules, language style, and compliance with industry regulations. For example, the guidelines might dictate that answers should be written in clear, jargon-free language, and that all content must comply with relevant data protection regulations. The guidelines ensures that the FAQ content is not only informative but also professional and compliant with legal standards.

In one embodiment, the generated Q/A pairs 134 may be subjected to an optional human verification process 136, where human reviewers assess the accuracy and relevance of the generated Q/A pairs 134. Alternatively, the human verification process 136 may be performed during off-peak times or based on randomly selected Q/A pairs 134. Human verification is performed for maintaining high-quality content and includes cross-checking the information against reliable sources. If the verification review is negative, the generated Q/A pair is sent to the aggregator 130 for aggregating a new Q/A pair. If the verification review is positive, the generated Q/A pair is sent to an importance ranker 138. Human reviewers ensure that the FAQs are correct, complete, and useful for customers. They may also provide feedback to improve the accuracy of the answers generator 122 and questions generator 116.

The verified Q/A pairs are evaluated by an importance ranker 138, which prioritizes the most relevant and frequently asked questions. The importance ranker 138 uses algorithms to analyze factors such as question frequency, customer impact, and relevance to prioritize the Q&A pairs. For example, questions that are asked frequently or have a high impact on customer satisfaction will be given higher priority.

The final output is stored in the FAQs database 140, making it accessible for customer support and self-service portals. The FAQs database 140 is a centralized repository that can be accessed by customer service representatives and customers through various channels such as websites, mobile apps, and chatbots. This database ensures that customers have quick and easy access to accurate and relevant information, improving their overall experience and reducing the workload on customer service teams.

In one embodiment, the final output is posted to a FAQ Web page for display. The generated FAQs can be ranked based on a plurality of factors, and displayed in ranked order.

In an illustrative typical scenario, a customer calls the call center and receives a report related to an issue with their internet connection. The audio file 104 of this conversation is stored in the call center audio calls database 102. The segmentation system 106 processes the audio file, distinguishing between the customer and the agent's voices. The ASR engine 112 then transcribes the segmented audio into text, capturing the details of the customer's issue and the agent's troubleshooting steps. The questions prompt 114 identifies the customer's main concern, and the questions generator 116 formulates a relevant question such as "How can I fix my internet connection?" The answer prompt 120 and answers generator 122 create a corresponding answer based on the agent's advice, such as "Restart your router and check the connection cables." The frequently asked questions aggregator 126 compiles this Q&A pair, which is then verified by human reviewers in the human verification process 136 and stored in the FAQs database 140. This process ensures that the FAQs are accurate, relevant, and easily accessible to other customers experiencing similar issues.

In another example, a customer calls to provide feedback on a recently purchased product. The audio file is processed similarly through the segmentation system 106 and the ASR engine 112. The system identifies segments where the customer discusses their experience with the product and where the agent acknowledges and responds to the feedback. The questions prompt 114 and answers generator 122 work together to generate a question like "What do customers think about the new product?" and an answer summarizing the feedback received. This Q&A pair is then verified and stored, providing valuable insights for future customers and helping the company improve its products and services.

Figure 1B:
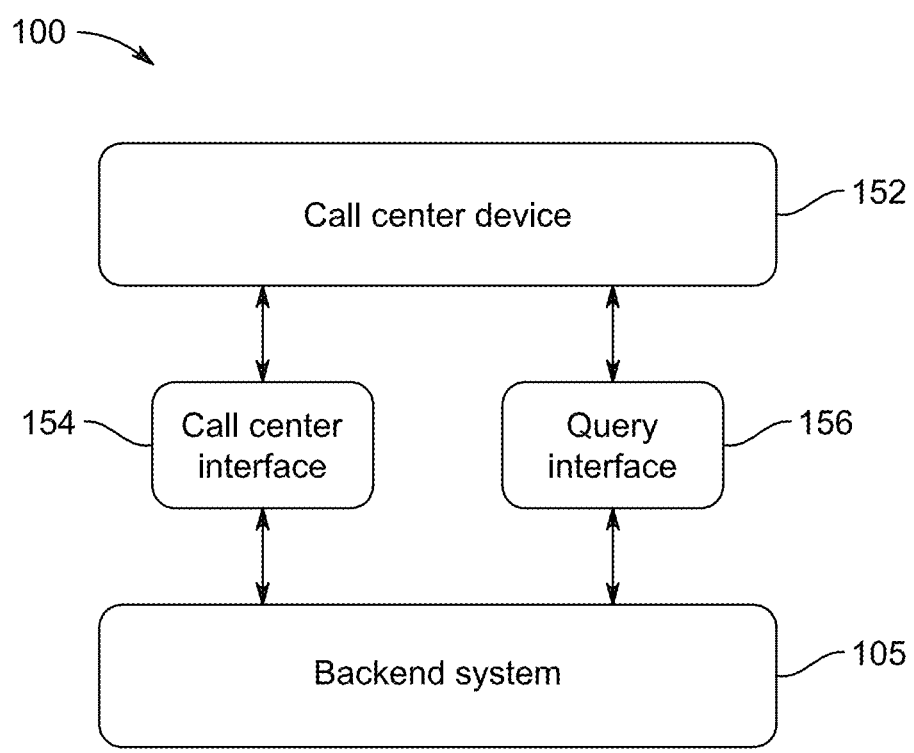
FIG. 1B illustrates a block diagram of the call center system, according to certain embodiments.

FIG. 1B illustrates a block diagram of the call center system 100 implemented for the automated generation of FAQs from call center interactions, in accordance with the present disclosure. FIG. 1B should be viewed in conjunction with FIG. 1A. The system 100 comprises a call center device 152, a backend system 105, a call center interface 154, and a query interface 156.

The call center device 152 is configured to address incoming audio calls and facilitate interactions between a call center agent and a customer. The call center device 152 also records the audio calls as call center conversations, capturing the spoken dialogue between the agent and the customer.

The backend system 105 is configured for processing the recorded call center conversations, as described in FIG. 1A. The backend system 105 segments the conversation between speech by the agent and speech by the customer. The segmented speech is then converted into text using an ASR engine integrated within the backend system 105. Following this, the backend system 105 utilizes a Large Language Model (LLM) to generate FAQs from the transcribed text. Each generated FAQ includes a query statement corresponding to the speech by the customer and at least one answer statement corresponding to the speech by the agent.

The call center interface 154 is designed to display the call center conversation along with an icon and associated function to generate FAQs. This interface provides the call center agents with a tool to view and interact with the generated FAQs, enhancing their ability to provide timely and accurate responses to customer inquiries.

The query interface 156 displays a plurality of generated FAQs, each accompanied by a dropdown arrow that allows the user to view the associated answers. This interface enables both agents and customers to access relevant information quickly, improving the overall efficiency and effectiveness of the customer support process.

The system 100 further includes mechanisms within the backend system 105 to select relevant, non-duplicate FAQs, determine the importance of each FAQ using factors such as frequency, sentiment score, and coherence score, and rank and select the top FAQs according to their respective importance scores. Additionally, the backend system 105 is configured to dynamically update the FAQ database in real-time as new call center interactions are processed, ensuring that the FAQ content remains current and reflective of the latest customer concerns and inquiries.

Figure 2:
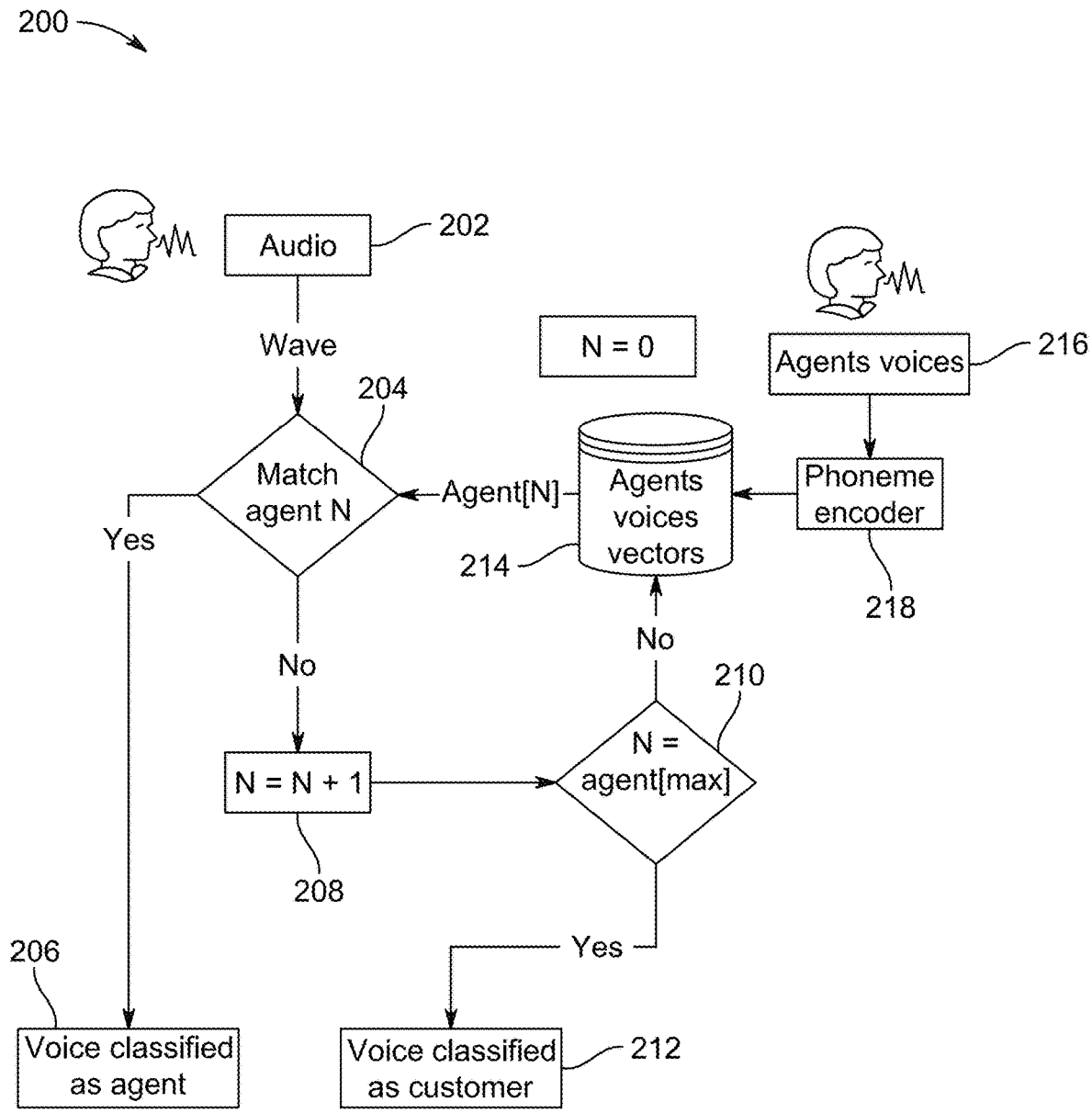
FIG. 2 illustrates a flowchart of a segmentation algorithm implemented for automated FAQ generation from call center interactions, according to certain embodiments.

FIG. 2 illustrates a flowchart of the segmentation algorithm 200 employed in the system 100 for automated FAQ generation from call center interactions.

At step 202, an audio file is provided as input. In one embodiment, the audio file is retrieved from the call center audio calls database, which comprises recorded conversations between customers and agents. In an alternative embodiment, the audio file is retrieved from a buffer of most recent call center audio calls. These audio files serve as the primary data sources for subsequent processing stages.

At step 204, the audio file is analysed to determine which segments of the conversation relate to a customer and which segments relate to an agent. N indicates a number of customer care representatives. The segments of the audio conversation are compared against the voice of each agent. If the audio file is detected as a match to an agent, the voice is classified as an agent audio, at step 206. In addition, various signal processing techniques, such as Voice Activity Detection (VAD), are typically utilized to differentiate speech from non-speech segments. For instance, the system might analyze the energy levels and spectral features of the audio signal to identify segments with human speech characteristics.

At step 208, the system sets a counter to perform voice recognition step till voice of each of the agents is compared, and the segment of the audio file is labelled as the agent audio. If the audio file segment is not matched to first agent's voice, voice of next agent voice is compared. At step 208, algorithms, such as Gaussian Mixture Models (GMM) or more advanced deep learning techniques like Convolutional Neural Networks (CNN) may be employed to classify the speaker based on pre-defined acoustic features.

When each agent's voice is compared and the audio file segment is not attributed to the agent, the audio file segment is labelled as a customer voice, at step 210.

At step 210, the system labels the speech segment as 'Customer.' This categorization is obtained for subsequent processing and analysis, ensuring that the content spoken by the customer is accurately identified and separated from other parts of the conversation.

If, in step 208, the speech segment is not attributed to the customer, the process proceeds to step 212, where it is assessed whether the speech segment belongs to the agent. The system employs similar classification techniques as in step 208 to determine the speaker identity.

At step 214, if the audio file segment is not attributed to the agent and the audio file segment is not compared with all agents, the audio file segment is compared with agents voice vectors. The agent vectors are obtained voice from the agents.

At step 216, voice of each of the agents is recorded. At step 218, the speech segments are processed by a phoneme encoder. The phoneme encoder converts the segmented speech into a series of phonemes, the distinct units of sound that differentiate one word from another in a given language. The phenom encoder is implemented for enhancing the accuracy of subsequent transcription and analysis tasks. For instance, a Hidden Markov Model (HMM) or a Recurrent Neural Network (RNN) might be used to model the temporal dynamics of speech and accurately encode phonetic details.

The segmentation algorithm 200 is implemented for processing call center audio data. By accurately attributing each part of the conversation to either the customer or the agent and correctly identifying non-speech elements, the system maintains the integrity and context of the dialogue.

Figure 3:
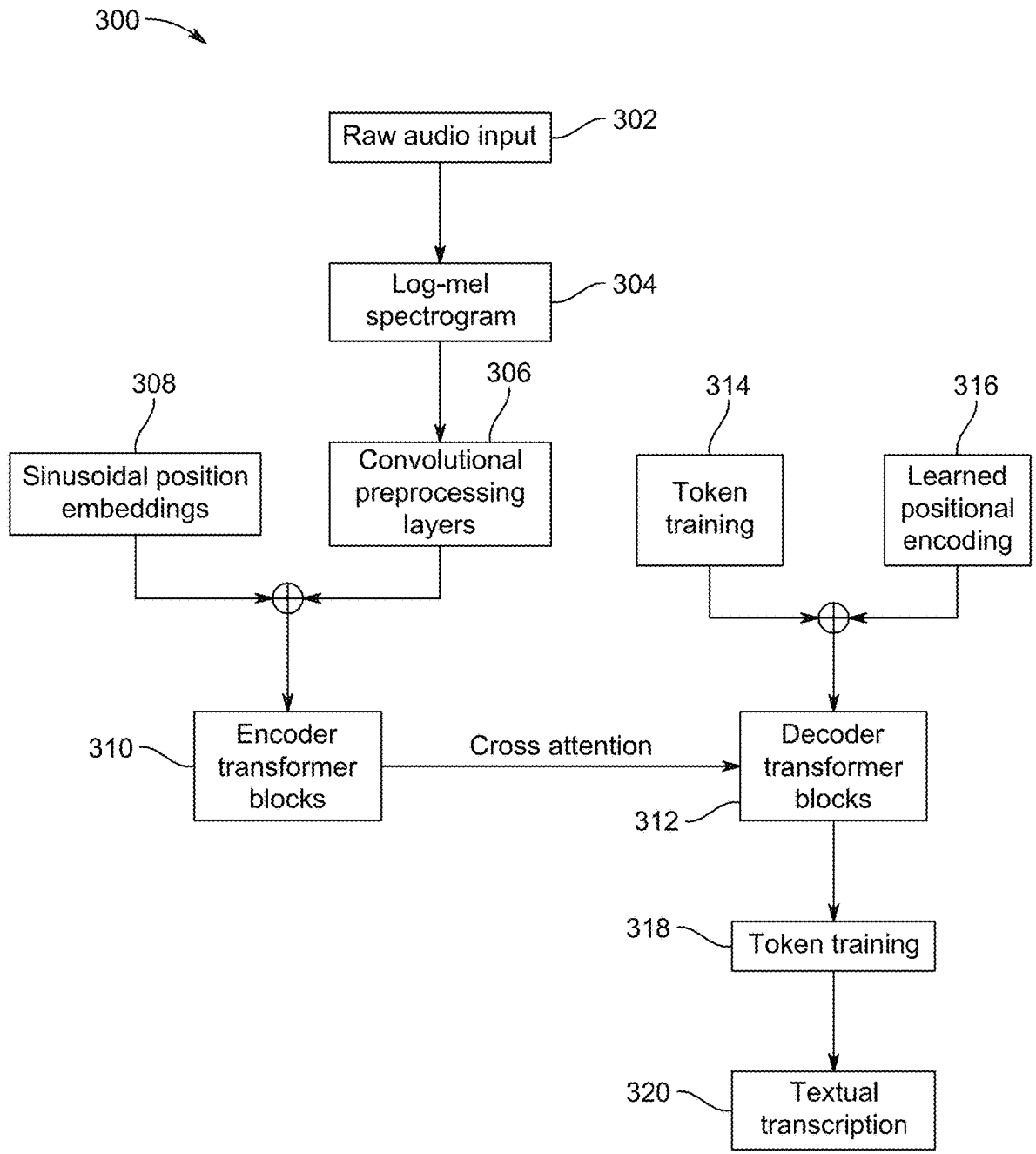
FIG. 3 illustrates an exemplary architecture of an ASR engine, according to certain embodiments.

FIG. 3 illustrates an exemplary architecture of an ASR engine, in accordance with certain embodiments of the present disclosure. The ASR engine 300 is configured to convert raw audio input into textual transcription through a series of sophisticated processing steps, leveraging both convolutional and transformer-based neural networks.

At block 302, the raw audio input, where unprocessed sound waves are captured by a microphone or other audio input devices, are obtained by the ASR engine 300. The raw audio input serves as the primary data source for the subsequent processing steps. The raw audio input is then transformed into a log mel spectrogram, at block 304. The log mel spectrogram is a representation of transforming raw audio input into a visual representation. Such transformation represents the frequency components of the audio signal over time, thereby facilitating effective processing by neural networks for speech recognition and subsequent FAQ generation.

The log mel spectrogram represents the audio signal in terms of its frequency components, where the horizontal axis denotes time and the vertical axis denotes frequency. The intensity of the colors within the spectrogram corresponds to the amplitude of the frequencies at each time point. Such visual representation allows the neural network to effectively detect and process speech patterns embedded within the audio signal.

Next, the log mel spectrogram is processed through convolutional pre-processing layers, at block 306. The convolutional pre-processing layers capture spatial hierarchies and patterns within the spectrogram. The convolutional pre-processing layers contribute in reducing the dimensionality of the input while retaining essential audio features, thereby enhancing the efficiency and accuracy of the subsequent processing stages.

To provide the ASR engine 300 with information about the order of the audio frames, sinusoidal position embeddings are added to the processed data, at block 308. The sinusoidal position embeddings encode positional information using sinusoidal functions, contributing to maintain the temporal structure of the audio sequence as it moves through the neural network layers.

The pre-processed and position-encoded data is then provided to the encoder transformer, at block 310. The encoder transformer includes multiple layers of self-attention and feed-forward neural networks. The encoder transformer is configured for generating a high-dimensional representation of the input audio by capturing complex dependencies and contextual information within the data. Self-attention mechanisms within the encoder transformer allow the ASR engine 300 to weigh the importance of different parts of the audio sequence dynamically.

The encoded representation from the encoder transformer block 310 is then provided to the decoder transformer block 312 for decoding. The decoder transformer generates textual transcription from the encoded audio representation. The decoder transformer operates in an autoregressive manner, generating the transcription token by token. A masked self-attention mechanism is implemented so that each token is generated based only on the previously generated tokens, at block 318, preserving the causal structure of the output sequence. The encoder-decoder attention mechanism aligns the encoded audio features with the corresponding textual tokens to produce accurate transcriptions, at block 320.

Token training is a training phase, including adjustment of the model with a large corpus of tokenized text data. Token training is performed at step 314 that includes fine-tuning the model parameters to minimize the difference between the predicted tokens and the actual tokens in the training data, enabling the ASR engine 300 to learn the statistical properties of the language and improve its transcription accuracy.

The learning positional coding component is implemented so that the ASR engine 300 can effectively incorporate positional encodings, at block 316. The learning positional coding maintains the temporal order of the audio input, which is essential for generating coherent and contextually appropriate transcriptions.

The final output of the ASR engine 300, the textual transcription, is obtained at block 320, which is the human-readable text corresponding to the raw audio input. The textual transcription is generated by the decoder transformer block and represents the spoken words captured in the raw audio input.

The ASR engine 300 as described with reference to FIG. 3 is applied with various processes, particularly to train the machine learning models. One such process is a fine tuning process of the audio files. The fine-tuning process is implemented for adapting pre-trained LLMs for specific tasks, such as generating FAQs from call center transcripts.

The fine-tuning process includes adjusting the weights of a pre-trained model to effectively perform the new task of generating FAQs from call center transcripts. The training strategy is based on a custom loss function specifically designed to balance several crucial aspects of text generation, coherence, relevance, and diversity. The loss function is a composite metric designed to optimize different facets of the generated text, combining Negative Log Likelihood (NLL) for fluency, a relevance score for accuracy, and a diversity metric to ensure varied responses. The loss function is determined by:

$$L_{total} = \alpha L_{NLL} + \beta L_{Relevance} + \gamma L_{Diversity}$$

Negative Log Likelihood ($L_{NLL}$) component measures the model's ability to predict the next token given a sequence of previous tokens, which is crucial for generating coherent and contextually appropriate text.

$$L_{NLL} = -\sum_{i=1}^{N} \log P(w_i | w_1, \ldots, w_{i-1}; \Theta)$$

Here, $w_i$ represents the i th word in the sequence, N is the sequence length, and $\Theta$ denotes the model parameters.

Relevance Score ($L_{Relevance}$) metric evaluates how relevant the generated answer is to the given question. It can be computed using techniques, such as cosine similarity between the embedding vectors of the question and the generated answer.

$$L_{Relevance} = 1 - \text{cosine\_similarity}(\text{embed}(\text{question}), \text{embed}(\text{answer}))$$

Diversity Metric ($L_{Diversity}$) encourages the model to explore a wider range of expressions, preventing overfitting to repetitive patterns. A simple approach to quantifying diversity is to measure the uniqueness of tokens in the generated text.

$$L_{Diversity} = -\frac{\text{unique\_tokens}(\text{answer})}{\text{total\_tokens}(\text{answer})}$$

Following the initial training phase, the model outputs preferably are rigorously evaluated in an iterative feedback loop by domain experts to assess their quality across multiple dimensions, including accuracy, relevance, and user engagement. The iterative feedback loop is used for performing subsequent adjustments to the model's training regimen. These adjustments may include modifications to a nuanced loss function's weighting coefficients and additional iterations of fine-tuning to address any identified deficiencies or shortcomings. This iterative feedback loop, characterized by the nuanced loss function and expert-driven refinements, enables the Large Language Model (LLM) to generate FAQs that are not only informative and pertinent but also reflective of the diverse range of inquiries encountered in call center transcripts. This iterative feedback significantly enhances the overall customer support experience by ensuring that the generated FAQs meet high standards of quality and relevance.

Selecting appropriate hyperparameters and optimization strategies is crucial for the efficient training and fine-tuning of Large Language Models (LLMs). Several key hyperparameters are included in the fine-tuning process for generating FAQs from call center transcripts. Additionally, the optimization strategies employ and optimization algorithm.

In particular, the fine-tuning process includes several hyperparameters, such as the learning rate, batch size, and number of training epochs. These hyperparameters are selected and tuned to ensure optimal model performance. The learning rate controls the step size during gradient descent, and it is essential to choose a value that balances convergence speed with the risk of overshooting minima. The batch size determines the number of samples processed before the model's internal parameters are updated. Larger batch sizes can provide more stable gradient estimates, while smaller batches can offer more frequent updates. The number of training epochs defines how many times the entire dataset is passed through the model during training, impacting the model's ability to generalize from the training data.

TABLE 1 summarizes the key hyperparameters, their typical values or ranges, and their impact on training.

| Hyperparameter | Typical Value/Range | Description |
| --- | --- | --- |
| Learning Rate | 1e–5 to 5e–5 | Determines the size of steps the optimizer takes during parameter updates. A smaller learning rate ensures more precise updates, but training will take longer. |
| Batch Size | 16 to 64 | The number of training samples that are processed before the model's internal parameters are updated. Larger batch sizes provide more stable gradients, but require more memory. |
| Number of Epochs | 3 to 10 | The number of times the entire dataset is passed through the model. Sufficient epochs are necessary for convergence, but too many can lead to overfitting. |
| Sequence Length | 128 to 512 | The maximum length of the input sequences (in tokens). Longer sequences capture more context but increase computational requirements. |
| Warm-up Steps | 10% of total training steps | The number of steps at the beginning of training during which the learning rate linearly increases to its maximum value. This helps stabilize the model's early training phase. |
| Weight Decay | 0.01 | A regularization technique that helps prevent overfitting by penalizing large weights. |

TABLE 1-continued summarizes the key hyperparameters, their typical values or ranges, and their impact on training.

| Hyperparameter | Typical Value/Range | Description |
|---|---|---|
| AdamW Parameters | $\beta_1 = 0.9$, $\beta_2 = 0.999$, $\epsilon = 1e{-}8$ | Parameters for the AdamW optimizer, including the exponential decay rates for the moment estimates and a small number to prevent division by zero. |

For the fine-tuning of LLMs, in one example, the AdamW optimizer is selected due to its effectiveness in handling sparse gradients and its incorporation of weight decay for regularization. The use of a scheduler for learning rate adjustment, particularly one that implements a warm-up period followed by a decay (e.g., linear or cosine decay), is a common practice. This approach allows for more refined control over the learning rate, accommodating the nuances of fine-tuning where starting with too high a learning rate could lead to catastrophic forgetting, and too low a rate could result in negligible learning progress. The combination of the key hyperparameters and the optimization strategy plays a crucial role in the fine-tuning process, impacting the model's ability to learn from the dataset effectively and efficiently. Adjustments to these parameters may be necessary based on the specific characteristics of the dataset and the performance observed during initial training runs, highlighting the importance of an iterative approach to model development.

In the process of generating FAQs from extensive call transcripts, one key aspect is to rank the generated questions according to their relevance, importance, and uniqueness. Various embodiments of the present disclosure are configured to select the most relevant FAQs without duplication, leveraging the latest advancements in natural language processing.

The ASR engine 300 is configured to perform in three main steps. Firstly, the ASR engine 300 constructs a contextual similarity matrix to detect duplicate FAQs, ensuring that only unique questions are considered. Secondly, the ASR engine 300 determines scores for each unique FAQ based on its importance, utilizing a combination of factors such as frequency of occurrence and contextual relevance. Finally, the algorithm performed by the ASR engine 300 ranks and selects the top FAQs, ensuring that the most relevant and significant questions are prioritized. This approach ensures that the generated FAQs provide valuable and diverse information, enhancing the overall utility of the FAQ system for customer support.

Contextual embeddings from pre-trained language models are used to represent the FAQs, capturing the semantic nuances of the text. The process of finding the similarity between FAQs can be explained as follows:

Given a set of candidate FAQs $F=\{f_1, f_2, \ldots, f_n\}$, the embeddings $\{v_1, v_2, \ldots, v_n\}$ are computed. The similarity matrix S is defined as $S=[s_{ij}]$ where:

$$s_{ij} = \frac{v_i \cdot v_j}{\|v_i\| \|v_j\|}, \text{ for } 1 \leq i, j \leq n$$

$s_{ij}$ is the cosine similarity between the embeddings of FAQs $f_i$ and $f_j$.

The importance score for an FAQ is calculated using several factors derived from an LLM, including frequency, sentiment, and coherence. A FAQ generated by the LLM includes factors of frequency, sentiment, and coherence. Frequency of a FAQ can be determined based on a quantity of similar FAQs. Sentiment is a value between 0 and 1 that represents the question's emotional tone (negative, neutral, or positive). Coherence score is value representing how much the answer is relevant to the question by similarity between the question and the answer.

Importance Score Calculation: The importance score $I(f_i)$ for an FAQ $f_i$ is a weighted sum of its frequency, sentiment score, and coherence score, defined as:

$$I(f_i) = \omega_1 \cdot \text{Frequency}(f_i) + \omega_2 \cdot \text{SentimentScore}(f_i) + \omega_3 \cdot \text{CoherenceScore}(f_i)$$

where, $\omega_1$, $\omega_2$, $\omega_3$ are the weights for each component, where the weights are established through experimentation to find the optimal balance between frequency, sentiment, and coherence in the importance calculation.

The non-duplicate FAQs are ranked according to their importance scores and selected for the final output. In one embodiment, a predetermined number of ranked FAQs are posted to a Web page as a dynamic display for up to date and relevant FAQs. The predetermined number may be set by a system administrator, or may be determined by a user of the Web page. In an embodiment, the predetermined number of FAQs may be expanded to include a greater set of FAQs by the user of the Web page.

---

Algorithm 1: FAQ Ranking and Deduplication Algorithm

---

Initialize empty list RankedFAQs
Compute embeddings for all candidate FAQs to form a set $F$
Construct similarity matrix $S$ using cosine similarity
for each FAQ $F_i$ in F do
    Compute importance score $I(f_i)$
    if no $F_j$ exists in RankedFAQs with $s_{i,j} > \theta$ then
        Append $F_i$ to RankedFAQs with score $I(f_i)$
    end if
end for
Sort RankedFAQs in descending order of importance score
return RankedFAQs

---

The system 100, described in FIG. 1, having the ASR engine 300, as described in FIG. 3, is configured to automatically generate FAQs in real time. Upon the user selecting and uploading stored or buffered audio call recordings, the system 100 1 automatically segments the audio, identifies each speaker, and transcribes the spoken content. The transcription results are displayed from the conversations in the calls. Subsequently, the user can generate a FAQs document by activating a button located at the bottom of an interface. The interface is implemented through a computing device accessed by the user, which may be a customer care administrator.

The FAQs are generated from the transcribed audio calls from the preceding process. Each generated question is presented with a dropdown arrow, allowing the user to view the corresponding answers, which are derived from the agents' responses during the calls. The system 100 thus renders the efficient creation and organization of FAQs based on real customer interactions, enhancing the accessibility and utility of the information for both customers and agents.

FIG. 4 is a visual representation of an exemplary call transcription corresponding to a call between an agent and a customer, in accordance with certain embodiments of the present disclosure. A display 400 captures the nuanced dialogue exchanges within a customer service environment, providing a detailed transcription of the interactions. Capabilities of the system for distinguishing between the voices of the agent and the customer ensure that each segment of the conversation is accurately attributed to the correct speaker.

The customer initiates the interaction by requesting assistance, followed by a series of inquiries and responses. The agent provides detailed guidance and support, addressing the customer's issues and queries comprehensively. This detailed transcription process ensures that every relevant piece of information is captured, forming a robust basis for further analysis and processing. The transcription includes various types of interactions, such as greetings, detailed problem descriptions, troubleshooting steps, follow-up questions, and resolutions.

Each interaction within the system is meticulously documented, highlighting the dynamic nature of customer-agent conversations. The captured data generates accurate and contextually relevant FAQs, ensuring that the nuances of the dialogue are preserved and accurately represented in written form.

FIG. 5 is a visual representation of exemplary generated FAQs derived from one or more customer service calls addressing a same issue, in accordance with certain embodiments of the present disclosure. A display 500 displays frequently asked questions and their corresponding answers based on real-time call center interactions.

The generated FAQs includes a set of questions that reflect common customer inquiries. Each question is accompanied by a dropdown arrow, which, when expanded, reveals a detailed answer extracted from the agent's responses during the calls. The system ensures that the answers are contextually accurate and relevant, providing clear and concise solutions to the customers' issues.

Figure 6:
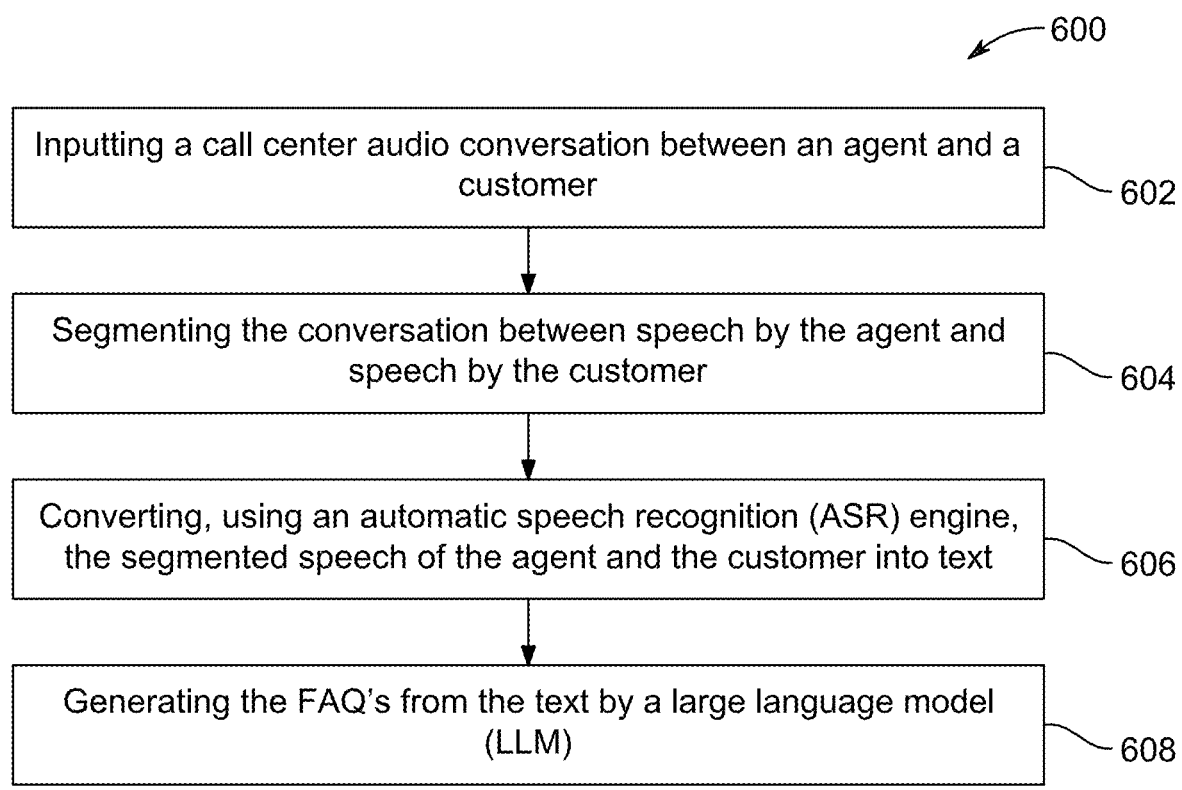
FIG. 6 illustrates a flow chart of a method for automated generation of FAQs from call center interactions, according to certain embodiments.

FIG. 6 illustrates a flow chart of a method 600 for the automated generation of FAQs from call center interactions. The method 600 encompasses several steps designed to convert audio conversations into structured FAQ content, enhancing the efficiency and effectiveness of customer support operations.

At step 602, the method 600 includes inputting a call center audio conversation between an agent and a customer. The step 602 includes capturing the raw audio data from the conversation, which serves as the primary input for the subsequent processing stages.

Step 604 includes segmenting the conversation between speech by the agent and speech by the customer. This segmentation is critical for distinguishing the different speakers and ensuring that the transcription process accurately reflects the individual contributions of the agent and the customer.

At step 606, the method includes converting, using an ASR engine, the segmented speech of the agent and the customer into text. The conversion transforms the audio input into a textual format, providing a clear and searchable record of the dialogue.

At step 608, the method includes generating the FAQ's from the text by a large language model (LLM). The LLM analyzes the text to identify relevant queries and their corresponding answers. Each FAQ includes a query statement corresponding to the speech by the customer and at least one answer statement corresponding to the speech by the agent.

The method 600 described in FIG. 6 integrates advanced speech recognition and natural language processing technologies to automate the creation of FAQs from call center interactions.

The implementation of the FAQ generation system, as describe through various embodiments of FIG. 1 to FIG. 6, is configured to integrate AI technology into existing call center operations. Upon implementation, the system can autonomously process incoming call center audio recordings by performing segmentation, transcription, and FAQ generation without requiring manual intervention. The system's backend can be hosted on a scalable private data center infrastructure, ensuring efficient handling of large data volumes.

The generated FAQs are accessible through a user-friendly interface, enabling customer service teams to effortlessly search for and retrieve information. This capability enhances the customer service representatives' ability to deliver quick and accurate responses and supports the development of self-service portals where customers can independently find answers to their questions.

Furthermore, the system is designed to be dynamic, with the capability to update its FAQ database in real-time as new call center interactions are processed. This feature ensures that the FAQs remain current and reflective of the latest customer concerns and inquiries, thereby providing an up to date resource for both customers and agents.

Figure 7:
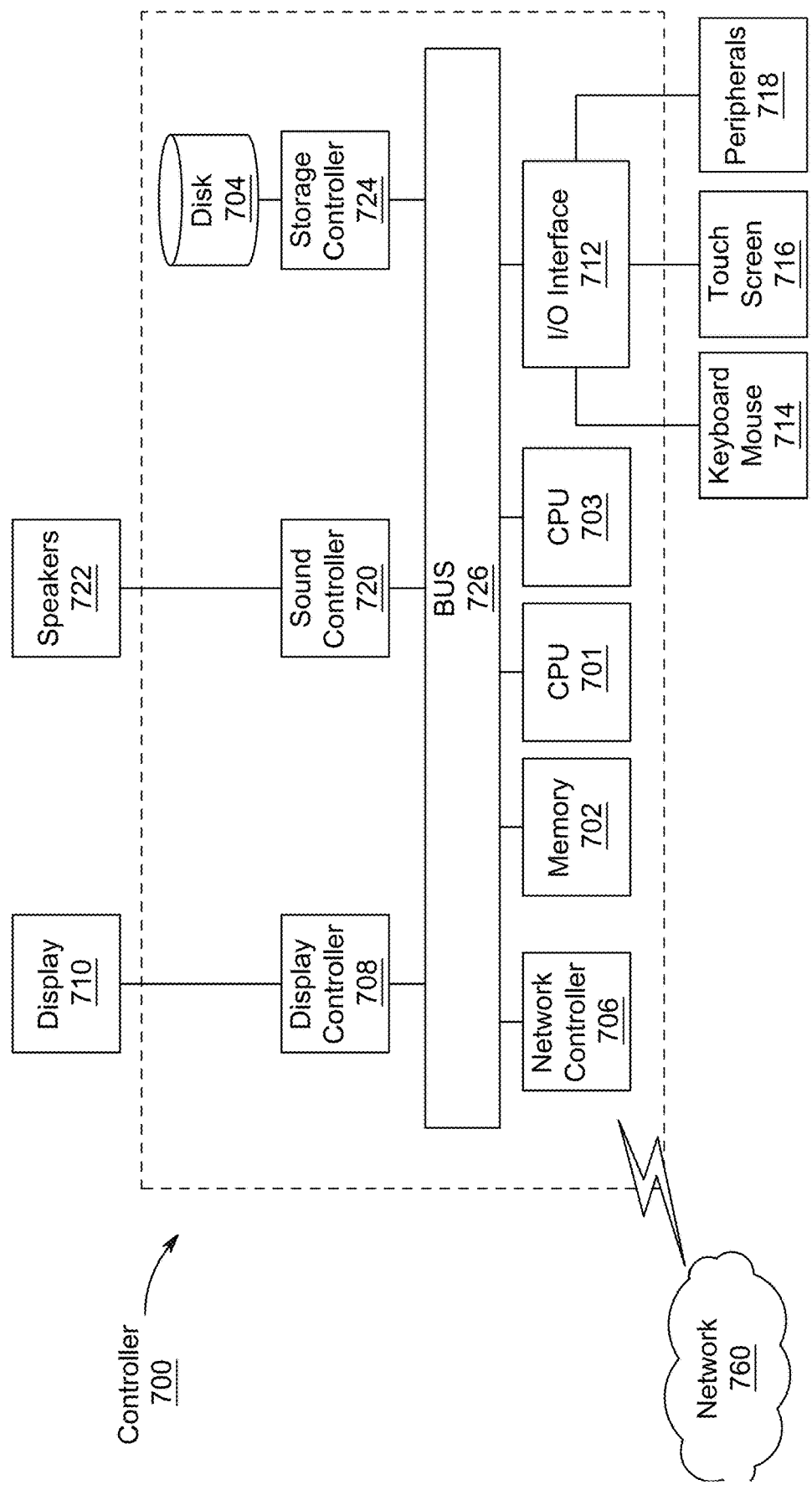
FIG. 7 is an illustration of a non-limiting example of details of computing hardware used in the automated FAQ generation system, according to certain embodiments.

Next, further details of the hardware description of the computing environment according to exemplary embodiments is described with reference to FIG. 7. In FIG. 7, a controller 700 is described is representative of the call center system 100 of FIG. 1 in which the controller 700 is a computing device which includes a CPU 701 and/or 703 which performs the processes described herein. The process data and instructions may be stored in memory 702. These processes and instructions may also be stored on a storage medium disk 704 such as a hard disk drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 701, 703 and an operating system such as Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 708, such as a NVIDIA GeForce RTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing the audio speech.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
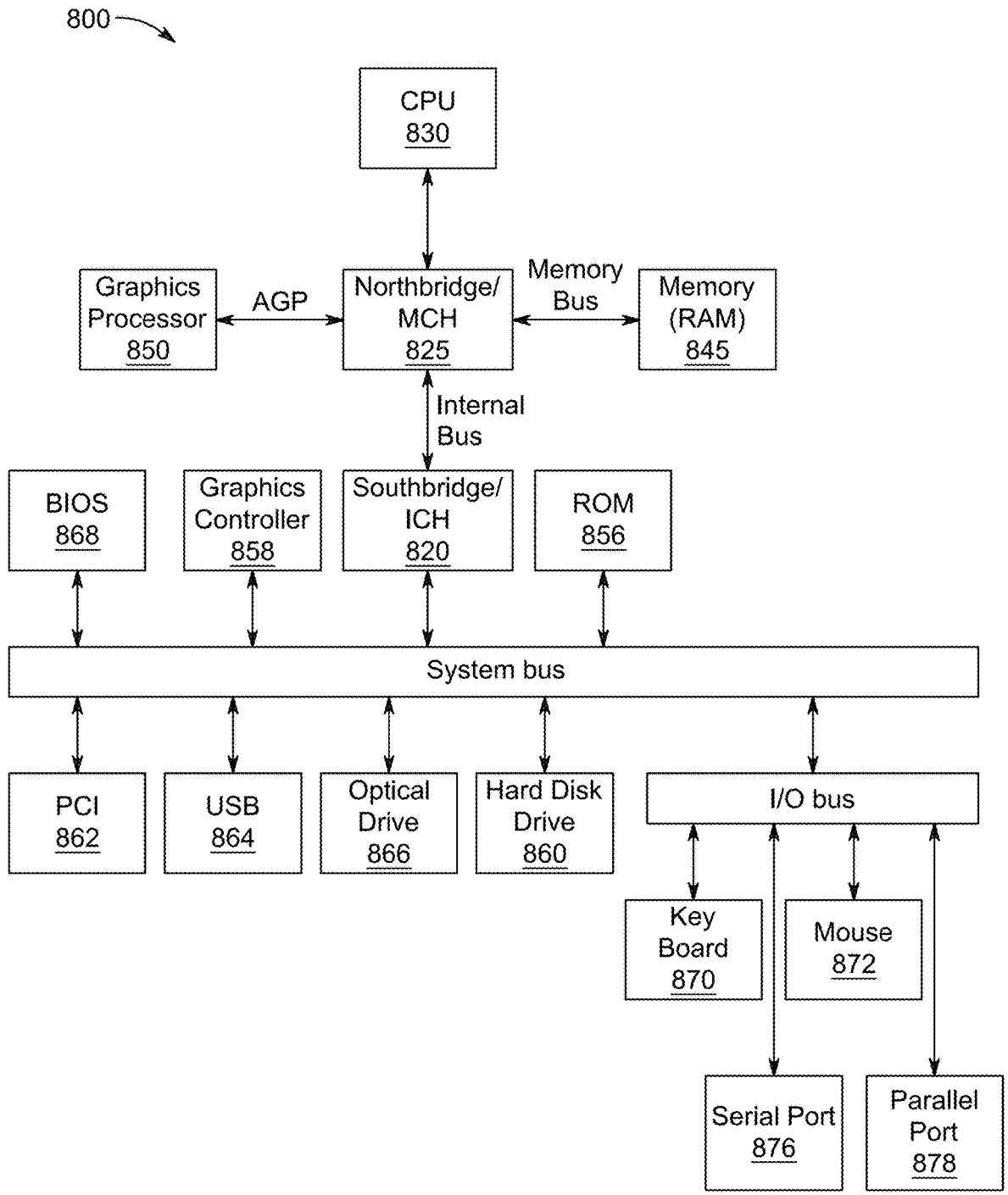
FIG. 8 is an exemplary schematic diagram of a data processing system used within the automated FAQ generation system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
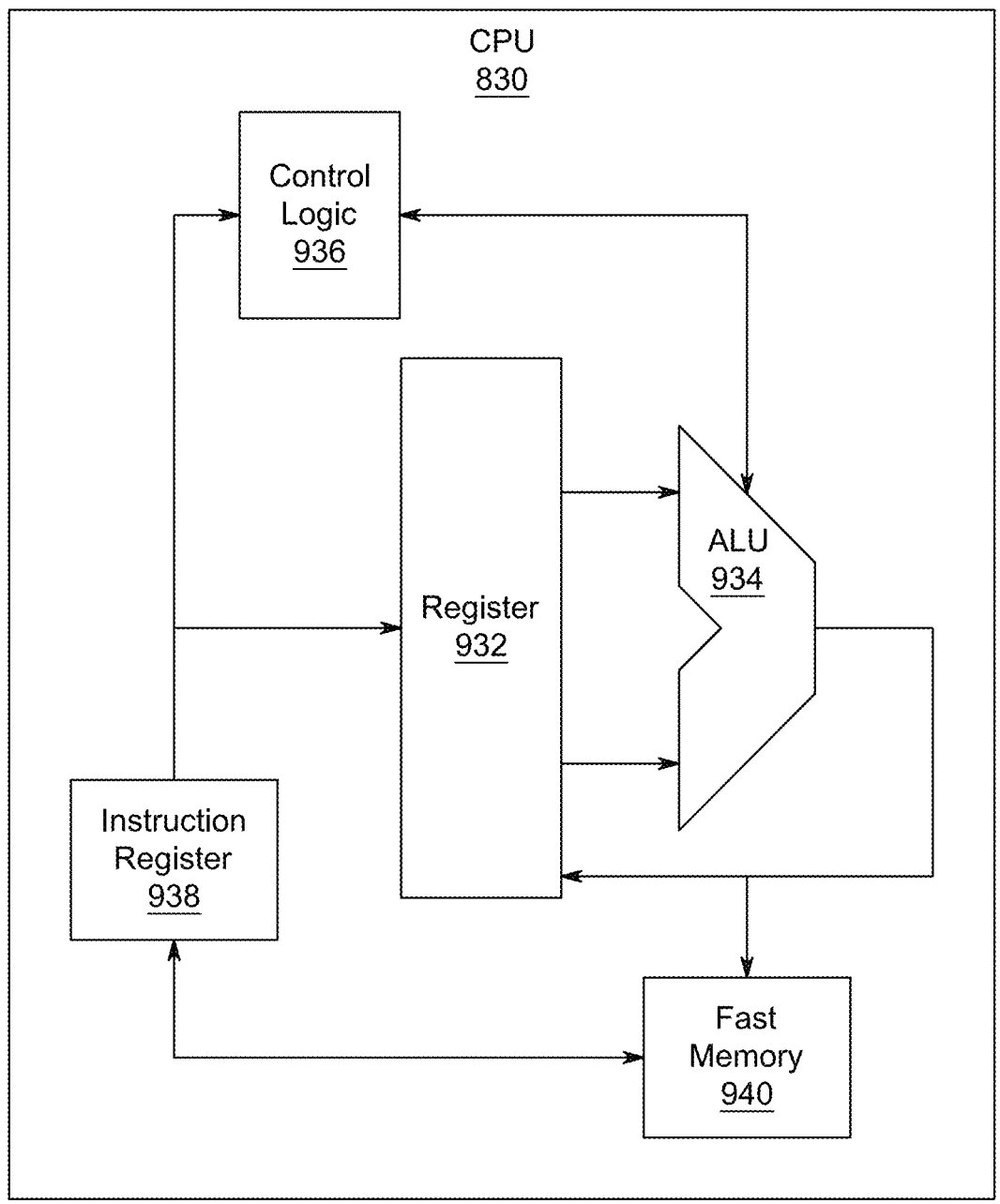
FIG. 9 is an exemplary schematic diagram of a processor used with the automated FAQ generation system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862. The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
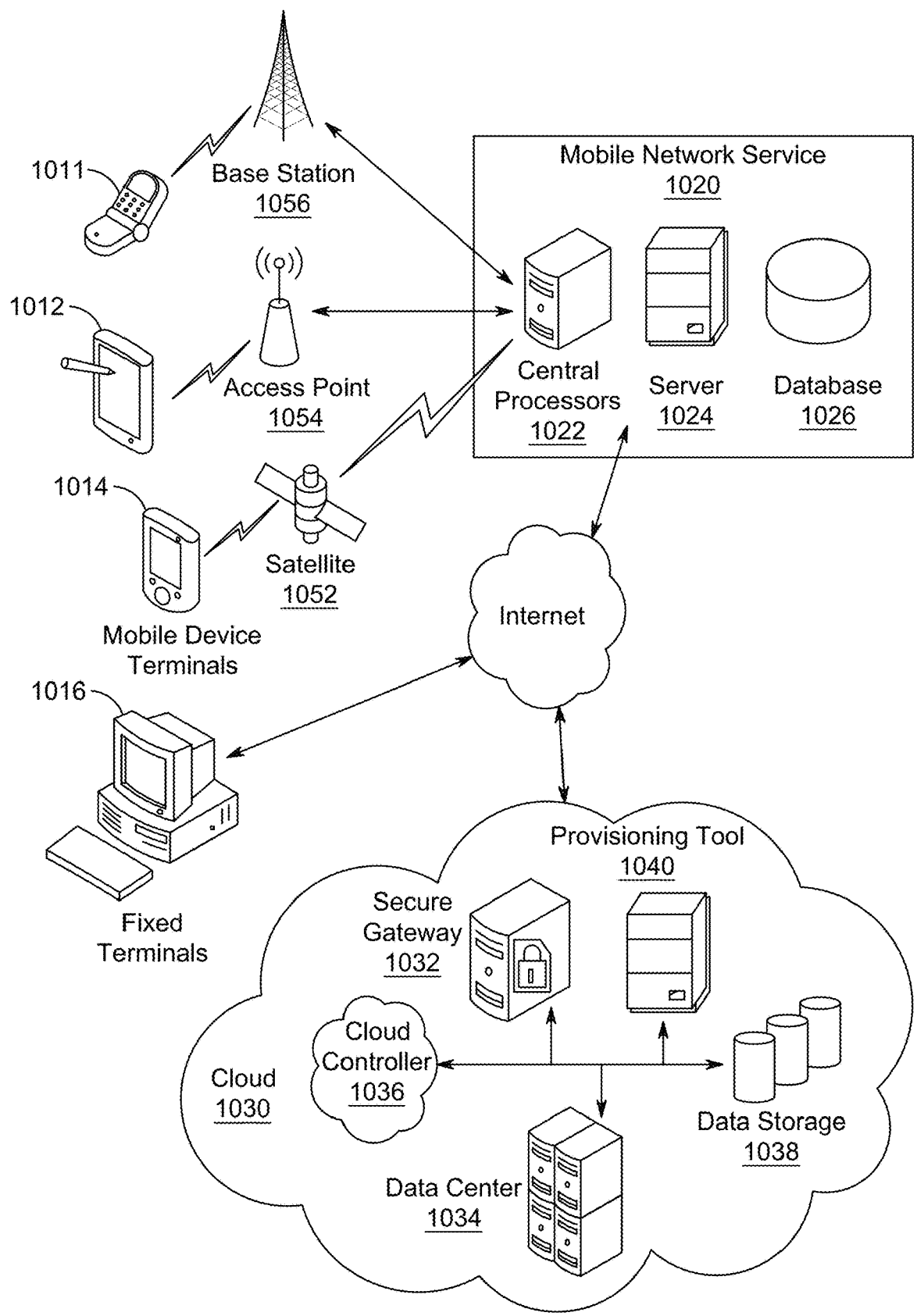
FIG. 10 is an illustration of a non-limiting example of distributed components which may share processing with a controller, according to certain embodiments.

FIG. 10 is an illustration of a non-limiting example of distributed components of a system. The functions and features described herein may also be executed by various distributed components of a system. For example, one or more processors may execute these system functions, wherein the processors are distributed across multiple components communicating in a network. The distributed components may include one or more client 1016 and server machines 1022, 1024, as well as a cloud 1030 including a cloud controller 1036, a secure gateway 1032, a data center 1034, data storage 1038 and a provisioning tool 1040, and mobile network services 1020 including the central processors 1022, the server 1024 and a database 1026, which may share processing, in addition to various human interface and communication devices (e.g., desktop computers 1016, smart phones 1011, tablets 1012, personal digital assistants (PDAs) 1014. The network may be a private network, such as a LAN, satellite 1052 or WAN 1054, 1056, or be a public network, may such as the Internet. Input to the system may be received via direct user input and received remotely either in real-time or as a batch process. Additionally, some implementations may be performed on modules or hardware not identical to those described. Accordingly, other implementations are within the scope of the disclosure.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A computer-implemented method of automated generation of Frequently Asked Questions (FAQs) from call center interactions, comprising:
   inputting a call center audio conversation between an agent and a customer;
   segmenting the audio conversation between speech by the agent and speech by the customer to obtain separate audio for the agent and audio for the customer;
   converting, using an Automatic Speech Recognition (ASR) engine, the separate audio for the agent and the audio for the customer into segmented text;
   separately generating queries and answers for the FAQ's from the segmented text by separate large language models (LLMs),
   wherein each of the queries includes a query statement corresponding with the speech by the customer and each of the answers includes at least one answer statement corresponding with the speech by the agent,
   wherein the LLMs output a plurality of factors associated with each generated FAQ, and
   wherein the method further comprises:
   ranking the generated FAQs based on the plurality of factors; and
   displaying the generated FAQs in ranked order.

2. The method of claim 1, further comprising determining a similarity between each pair of FAQs.

3. The method of claim 1, further comprising determining an importance score for each FAQ using the plurality of factors from the LLM.

4. The method of claim 3, wherein the importance score is determined using the plurality of factors including frequency of the FAQ, a sentiment score of the FAQ, and a coherence score of the FAQ.

5. The method of claim 2, further comprising:
   constructing a contextual similarity matrix using the determined similarities to detect and delete duplicate FAQs;
   scoring each unique FAQ for its importance to obtain a respective importance score;
   ranking each unique FAQ based on the respective importance score;
   selecting a predetermined number of highest ranked FAQs; and
   displaying the predetermined number of highest ranked FAQs.

6. The method of claim 1, wherein the generating step includes
   generating, by a query LLM, query statements using the segmented speech of the customer.

7. The method of claim 6, wherein the generating step further includes
   generating, by an answers LLM, the at least one answer statement in association with the generated query statements.

8. The method of claim 1, further comprising
   training the ASR using a dialect classification loss, which is determined based on a true dialect and a predicted dialect.

9. The method of claim 1, further comprising
   training the ASR using a temporal alignment loss, which is determined based on temporal alignment between sequences of predicted and true feature vectors.

10. The method of claim 1, further comprising
    displaying a plurality of generated questions, each question displayed with a dropdown arrow to view answer statements associated with a respective query statement.

11. A call center system comprising:
    a call center device for conducting an incoming audio call and providing answers and recording the audio call as a call center conversation between a call center agent and a customer;
    a backend system configured to
    segment the audio conversation between speech by the agent and speech by the customer to obtain separate audio for the agent and audio for the customer;
    convert, using an Automatic Speech Recognition (ASR) engine, the separate audio for the agent and the audio for customer into segmented text; and
    separately generate queries and answers for frequently asked questions (FAQ's) from the segmented text by large language models (LLMs),
    wherein each of the queries includes a query statement corresponding with the speech by the customer and each of the answers includes at least one answer statement corresponding with the speech by the agent,
    wherein the LLMs are configured to output a plurality of factors associated with each generated FAQ, and
    wherein the backend system is further configured to
    rank the generated FAQs based on the plurality of factors, and
    display the generated FAQs in ranked order.

12. The call center system of claim 11, further comprising
    a call center interface configured to display the call center conversation, and an icon and its associated function to generate a FAQ.

13. The call center system of claim 12, further comprising
    a query interface configured to display a plurality of generated FAQs, each query being displayed with a dropdown arrow to activate a view of answers associated with a respective query.

14. The call center system of claim 11, wherein the backend system is further configured to
    determine similarity between each pair of FAQs.

15. The call center system of claim 11, wherein the backend system is further configured to
   determine an importance score for each FAQ using the plurality of factors from the LLM.

16. The call center system of claim 15, wherein the backend system is further configured to
   determine the importance score using the plurality of factors including frequency of the FAQ, a sentiment score of the FAQ, and a coherence score of the FAQ.

17. The call center system of claim 14, wherein the backend system is further configured to
   construct a contextual similarity matrix using the determined similarities to detect and delete duplicate FAQs;
   score each unique FAQ for its importance to obtain a respective importance score;
   rank each unique FAQ based on the respective importance score; and
   select a predetermined number of highest ranked FAQs.

18. The call center system of claim 11, wherein the backend system is further configured to generate, by a query LLM, the query statement using the segmented speech of the customer.

19. The call center system of claim 18, wherein the backend system is further configured to generate, by an answers LLM, at least one answer statement in association with the generated query statement.

20. The call center system of claim 11, wherein the backend system is further configured to train the ASR using a dialect classification loss, which is determined based on a true dialect and a predicted dialect, and a temporal alignment loss, which is determined based on temporal alignment between sequences of predicted and true feature vectors.

* * * * *